United States Patent
Sun

[15] 3,677,023
[45] July 18, 1972

[54] PROCESS FOR DEHYDRATING ACETIC ACID

[72] Inventor: Yun-Chung Sun, Midland, Mich.
[73] Assignee: The Dow Chemical Company, Midland, Mich.
[22] Filed: June 1, 1970
[21] Appl. No.: 42,491

[52] U.S. Cl. ..................................62/58, 203/16, 260/541
[51] Int. Cl. ......................................B01d 9/04, C07c 53/08
[58] Field of Search ..........................62/58; 203/48, 88, 16; 260/541

[56] References Cited

UNITED STATES PATENTS

| | | | |
|---|---|---|---|
| 1,860,512 | 5/1932 | Ricard et al. | 203/16 |
| 1,867,943 | 7/1932 | Haworth | 203/16 |
| 1,941,951 | 1/1934 | Muller et al. | 62/58 |
| 2,010,548 | 8/1935 | Langwell et al. | 62/58 |
| 3,276,848 | 10/1966 | Barr et al. | 62/58 |
| 1,912,585 | 6/1933 | Lichtenthaeler | 260/541 |
| 1,916,106 | 6/1933 | Gorhan | 260/541 |
| 1,792,113 | 2/1931 | Mugdan et al. | 260/541 |
| 3,616,268 | 10/1971 | Philliou | 260/541 |

*Primary Examiner*—Norman Yudkoff
*Assistant Examiner*—R. T. Foster
*Attorney*—Griswold & Burdick, J. Roger Lochhead and C. E. Rehberg

[57] ABSTRACT

A process for dehydrating acetic acid containing up to about 20 weight percent water is disclosed wherein the crude acetic acid is cooled sufficiently to crystallize a substantial portion of pure acetic acid, and the remaining mother liquor, i.e., uncrystallized material, is vaporized under vacuum, i.e., at a pressure not exceeding about 15 mm. Hg, from the acetic acid crystals at a temperature between the freezing point of acetic acid and the eutectic temperature.

6 Claims, No Drawings

PROCESS FOR DEHYDRATING ACETIC ACID

BACKGROUND OF THE INVENTION

While it is desirable to remove as much water as possible from acetic acid, it has been found difficult to do so due to their close boiling points. Usual fractionation techniques, for instance, are effective but expensive.

It has now been found that the two components can be simply separated by a crystallization technique which provides acetic acid crystals in purer form and in better yield than can be realized with conventional crystallization.

SUMMARY OF THE INVENTION

Acetic acid containing up to about 20 weight percent water is dehydrated by a process which comprises cooling a crude acetic acid-water mixture sufficiently to crystallize a substantial portion of the acetic acid present, and vaporizing under vacuum the remaining mother liquor, i.e., uncrystallized material, said vaporization to occur at a temperature between the freezing point of acetic acid and the eutectic temperature.

There are several ways to practice the method of this invention. For instance, the mixture may first be crystallized by conventional cooling, such as an ice bath. One may then filter and/or centrifuge the slurry to remove most of the mother liquor.

Substantially all the mother liquor, or the portion remaining after the above physical separation, may be removed by vaporization by placing the slurry in a closed vessel and, while holding its temperature below the melting point of the crystals, (1) reducing the pressure in the vessel below the vapor pressure of the mother liquor (generally a pressure below about 15 mm. Hg); or (2) sweeping the interior of the vessel with an inert gas, such as air, $N_2$, and the like, to accomplish removal of the mother liquor vapors, allowing one to operate with or without a vacuum.

It is to be noted that the vaporization preferably should commence on a slurry whose temperature is below the freezing point of acetic acid (17.6°C.). Further, no purification is realized as to any crystals formed below the eutectic temperature (ca. −28°C.) during vaporization, since the acetic acid-water mixture becomes a solid mixture at that temperature. It is preferred to allow the temperature to fall no lower than the eutectic temperature.

It is also possible to accomplish the dehydration of acetic acid by a one-step method as follows:

A liquid acetic acid-water mixture containing no more than about 20 weight percent water is agitated under substantially adiabatic conditions, a vacuum drawn to produce a pressure in the container below about 15 mm. Hg, the vacuum being adjusted so that the temperature of the mixture does not fall below the eutectic temperature, thereby crystallizing pure acetic acid and vaporizing substantially all the water and some acetic acid. The initial temperature of the crude feed is preferably not above ambient temperature, and more preferably at or below that at which crystallization begins.

SPECIFIC EMBODIMENTS

EXAMPLE 1

100 ml. of acetic acid containing 6.07 weight percent of water was placed in a heat-insulated glass flask at 10°C. in liquid form. Agitation in the form of stirring was begun, and a vacuum pulled, thereby reducing the pressure so that crystallization was observed. At the end of 50 minutes, 76 percent of the material remained in the flask, being in the form of dry acetic acid crystals containing 0.36 weight percent water.

To compare conventional crystallization, 100 ml. of the same crude acetic acid was cooled in a flask to 0°C. with agitation. The crude crystals which resulted were centrifuged for 10 minutes. The product contained 2.4 weight percent water, with a yield of 62 percent acetic acid.

EXAMPLE 2

100 ml. of the same crude as above was cooled to 0°C. with an ice bath with agitation. After crystal formation, a vacuum was pulled, resulting in a pressure of about 10 mm. Hg, under isothermal conditions (0°C.). At the end of 60 minutes, 82 percent of dry acid crystals were recovered containing 0.54 weight percent water.

I claim:

1. A process of dehydrating acetic acid containing up to about 20 weight percent water comprising cooling the acetic-water mixture sufficiently to crystallize a substantial portion of the acetic acid present, and vaporizing under vacuum the remaining mother liquor, said vaporization to occur at temperatures between the freezing point of acetic acid and the eutectic temperature.

2. The process of claim 1 wherein the crystallization step is accomplished by conventional cooling.

3. The process of claim 1 wherein the vaporized mother liquor is removed by a stream of inert gas.

4. The process of claim 1 wherein a liquid acetic acid-water mixture is agitated under substantially adiabatic conditions and under a pressure below about 15 mm. Hg until substantially dry crystals of acetic acid remain.

5. The process of claim 4 wherein the temperature of the feed is not above ambient temperature.

6. The process of claim 5 wherein the temperature of the feed is at or below that temperature at which crystallization begins.

* * * * *